United States Patent Office 3,330,372
Patented July 11, 1967

3,330,372
SERVO-STEERING DEVICES FOR AUTOMOBILE VEHICLES
Antoine Brueder, Paris, France, assignor to Societe Anonyme Andre Citroen, Paris, France, a French corporation
Filed Oct. 22, 1965, Ser. No. 501,398
Claims priority, application France, Apr. 29, 1965, 15,160, Patent 88,225
1 Claim. (Cl. 180—79.2)

In the prior United States Patent No. 3,171,298 in the name of Henry-Biabaud and assigned to the Société Anonyme André Citroen, there has been described an improvement in servo-steering devices for automobile vehicles, consisting of associating with the steering pillar or shaft operating the servo-control device, another device adapted to apply to the said shaft a resistance proportional to the steering angle and preferably also proportional to the speed of the vehicle, this device comprising, in one preferred form of embodiment, a cam coupled for rotation with the said steering shaft on which is supported a roller urged by a variable pressure pneumatic or hydraulic device.

In another previous United States Patent No. 3,183,992, in the name of Antoine Brueder and also assigned to the Société Anonyme André Citroen, there has been described a particular form of construction of a device of this kind, and in particular of the regulator intended to supply a pressure varying with the speed, this regulator comprising particularly a slide-valve subjected at its extremities to the opposing actions on the one hand of a force produced by a centrifugal system responsive to the speed of the vehicle, and on the other hand of the liquid under pressure, in such manner that the pressure of the liquid delivered is continuously proportional to the above-mentioned force. However, as has been shown in FIG. 6 of the previous patent, the pressure tends to become zero at low speeds, and in order to remedy this drawback, it had been proposed to arrange between the centrifugal system and the slide-valve a spring having a pre-determined initial tension, the pressure then remaining constant up to a certain speed of the vehicle.

The present invention relates to an improvement in this regulator, which enables an increasing pressure to be obtained from the origin, and this, starting from a pressure having a determined value, not zero.

The improvement consists in providing, in addition to the first spring, a second spring acting in a constant manner irrespective of the speed of the vehicle, and in eliminating the initial tension of the first spring.

One form of embodiment of the invention has been shown by way of example in the accompanying drawings, in which.

Figure 1:
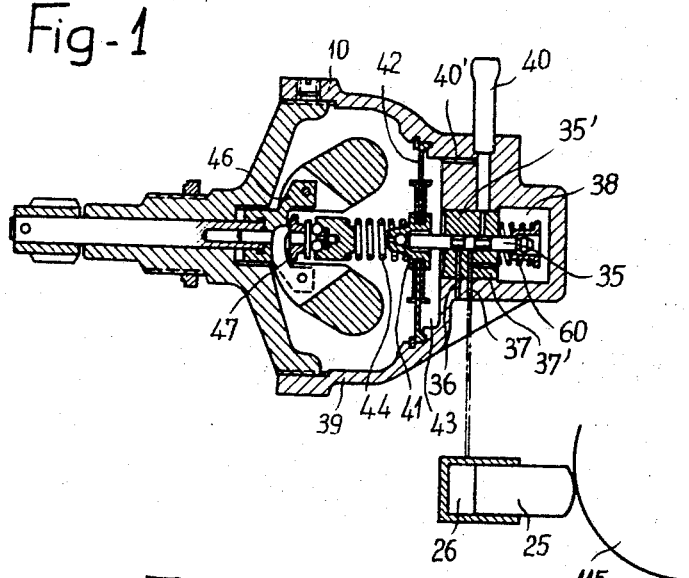
FIG. 1 shows a cross-section of the regulator device according to the present improvement.
Figure 2:
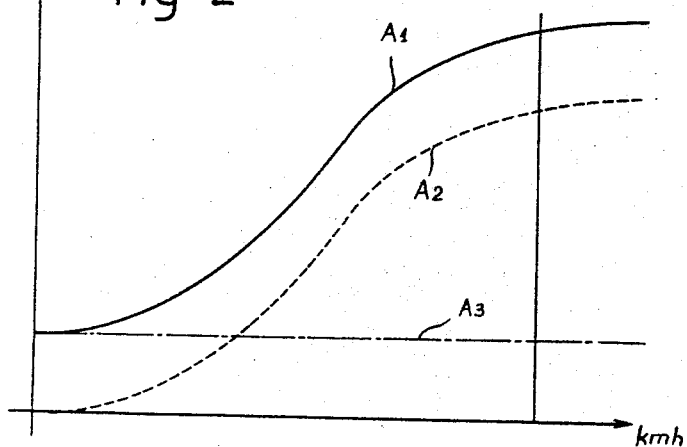
FIG. 2 is a diagram representative of the pressure obtained as a function of the speed of the vehicle.

The regulator device of FIG. 1 is in general conformity with that shown in FIG. 4 of the above-mentioned Patent No. 3,183,992. It comprises in a body 10 a slide-valve 35 of which one extremity is received by a ball-type push-rod 41 mounted centrally on a flexible diaphragm 42 which forms a chamber 43 in the part 39 of the regulator body. This push-rod is subjected to the action of a spring 44, the other extremity of which is supported against a push-rod 46 mounted in the axis of an inertia weight-carrier 47.

The slide-valve 35 is mounted in a distributor element 35' coupled to the source of pressure by the channel 36 and by the channel 37 to the jack 26 applying through a push-rod 25 the desired pressure on a member 115 coupled to a shaft of the steering control mechanism, as has been explained in the previous Patents 3,171,298 and 3,183,992. It is further coupled to the exhaust by the channel 40 by which the chamber 43 communicates with the narrow passage 40'.

On the side opposite to the spring 44 and to the centrifugal system 47, the slide-valve opens into a chamber 38 which is connected by a conduit 37' to the channel 37.

In accordance with the present improvement, a spring 60 is provided between the distributor element 35' and the head of the slide-valve. This spring is compressed so as to be calibrated to a constant pressure $A_3$ to which is added the pressure $A_2$ due to the compression of the spring 44 as a function of the speed of the regulator, this spring not having been pre-stressed.

The resulting pressure represented by the curve $A_1$, is applied on the piston 25. The result is that the force to be applied to the steering wheel increases progressively as the speed increases and corrects the defect of the previous device, in which the force remained constant up to a certain speed, by reason of the initial compression of the spring 44, which opposed any immediate displacement of the inertial weights.

What I claim is:

A servo-steering system for automobile vehicles, consisting of the association with the steering column which actuates said servo system of a device adapted to apply to said column a resistance proportional to the steering angle and preferably also proportional to the speed of said vehicle, said device comprising a cam coupled for rotation with said column, a push-rod co-operating with said column, a fluid-pressure jack adapted to actuate said push-rod, and a regulator which controls through a slide-valve the fluid-pressure acting on said push-rod, said regulator comprising for that purpose an elastic inertia-weight centrifugal system responsive to the speed of the vehicle and a spring arranged between said slide-valve and a fixed part, the force of said spring being applied in the same direction as said centrifugal system.

References Cited

UNITED STATES PATENTS

| 3,064,669 | 11/1962 | Sheppard | 137—57 X |
| 3,171,298 | 3/1965 | Henry-Biabaud | 74—495 |
| 3,183,992 | 5/1965 | Brueder | 280—94 X |

KENNETH H. BETTS, *Primary Examiner.*